United States Patent
Takehira

[19]

[11] Patent Number: 5,906,362
[45] Date of Patent: May 25, 1999

[54] COIL SPRING ASSEMBLY AND DAMPER MECHANISM

[75] Inventor: Yasushi Takehira, Neyagawa, Japan

[73] Assignee: Exedy Corporation, Neyagawa, Japan

[21] Appl. No.: 08/909,816

[22] Filed: Aug. 12, 1997

[30] Foreign Application Priority Data

Aug. 15, 1996 [JP] Japan .................................. 8-215649

[51] Int. Cl.$^6$ ................................ F16D 3/66; F16D 3/14
[52] U.S. Cl. .................... 267/179; 267/170; 267/287; 192/213; 192/213.22; 464/68; 464/64
[58] Field of Search ............................ 464/64, 66, 67, 464/68; 192/212, 213, 213.31, 213.22; 74/574; 267/170, 179, 287, 289

[56] References Cited

U.S. PATENT DOCUMENTS

| | | | |
|---|---|---|---|
| 1,595,317 | 8/1926 | Scholey | 267/174 |
| 4,162,064 | 7/1979 | Bouton et al. | 267/179 |
| 4,563,165 | 1/1986 | Takeuchi | 464/64 |
| 4,712,778 | 12/1987 | Newman | 267/179 |
| 4,778,161 | 10/1988 | Douillet | 267/179 |
| 4,973,030 | 11/1990 | Leonard | 267/71 |
| 5,690,554 | 11/1997 | Imanaka et al. | 464/68 |
| 5,697,846 | 12/1997 | Uenohara | 464/64 |
| 5,772,191 | 6/1998 | Nakano et al. | 267/179 |

FOREIGN PATENT DOCUMENTS

| | | | |
|---|---|---|---|
| 0020131 | 1/1991 | Japan | 267/179 |

*Primary Examiner*—Chris Schwartz
*Attorney, Agent, or Firm*—Shinjyu An Intellectual Property Firm

[57] ABSTRACT

To avoid an increase of the number of steps for assembling a coil spring and seat members and a reduction in mechanical strength of the coil spring or the like, a coil spring assembly 20 is provided with the coil spring 25 and the seat members 26. Each seat member 26 has receivers 27 for contacting both ends of the coil spring 25 and projections 28 extending into the coil spring 25 from the receivers 27. Ribs 29 are formed on an outer circumferential surface of the projections 28 for engagement with the coil spring 25.

2 Claims, 3 Drawing Sheets

COIL SPRING ASSEMBLY AND DAMPER MECHANISM

BACKGROUND OF THE INVENTION

1. Field of the Invention

The present invention relates to a coil spring assembly and a damper mechanism having coil springs for absorbing vibrations in a clutch disc assembly of a frictional clutch mechanism or the like, and more particularly to a structure in which seat members are disposed at end portions of the coil springs.

2. Description of the Related Art

In a clutch disc assembly of an automotive frictional clutch mechanism, an input member and an output member are connected to each other in a clutch rotational direction by a damper mechanism. In one such damper mechanism, there is a coil spring assembly having several coil springs. Each end of each coil spring is provided with a seat member.

During a clutch disc assembling process for such a coil spring assembly, the seat members are mounted to the coil springs prior to assembly of the clutch disc assembly. The coil spring assembly is assembled along with other parts of the clutch disc as a single coil spring assembly. With such an arrangement, in the clutch disc assembling process, it is easy to handle each coil spring assembly to thereby simplify the assembling work.

However, in most assembling processes, the seat members are mounted onto the ends of the coil springs by temporary bonding in advance. Namely, the seat members are fixed to the coil springs by a weak adhesive so that the seat members are not separated from the coil springs during the assembling of the clutch disc.

In this case, in the work for mounting the seat members to the coil springs, the process for applying the adhesives to the seat members is required as an independent process, which leads to the increase of the steps. Also, there is a fear that the hardened adhesives might subsequently fly or otherwise be separated from the seat members and the coil spring during the operation of the clutch. The stiffened adhesives would adhere to the respective parts of the clutch and adversely affect the operation or the mechanical strength of the respective parts of the clutch such as coil springs.

SUMMARY OF THE INVENTION

An object of the present invention is to prevent possible defects and failures which might be due to the assembling of coil springs and seat members.

In accordance with one aspect of the present invention, a coil spring assembly includes a coil spring and at least one seat member disposed at one end of the coil spring. The seat member is formed with a receiver and a projection which extends from the receiver into the coil spring. The projection is formed with a plurality of protrusions on an outer surface thereof, the protrusions extending from the projection contacting and engaging an inner surface the coil spring.

Preferably, the projection is cylindrically shaped and the protrusions are a plurality of ribs extending in an axial direction with respect to the projection.

In accordance with another aspect of the present invention, a damper mechanism includes a first rotary member having a first spring receiving portion and a second rotary member having a second spring receiving portion corresponding to the first spring receiving portion. A coil spring assembly is disposed in the first receiving portion and the second receiving portion elastically coupling the first and second rotary members. The coil spring assembly includes a coil spring and at least one seat member disposed at one end of the coil spring. The seat member is formed with a receiver and a projection which extends from the receiver into the coil spring. The projection is formed with a plurality of protrusions on an outer surface thereof, the protrusions extending from the projection contacting and engaging an inner surface the coil spring.

Preferably, the projection is cylindrically shaped and the protrusions are a plurality of ribs extending in an axial direction with respect to the projection.

In the coil spring assembly, when the coil spring is fitted around the projections of the seat members, the protrusions retain the coil spring so that the seat members are tentatively held in the ends of the coil spring. For this reason, it is possible to dispense with the conventional adhesive application step in the work for assembling the coil spring and the seat members. The number of the steps may be reduced. Also, it is possible to prevent the disadvantage that the hardened adhesives might be dislodged by friction or the like to adversely affect the mechanical strength and the operation of the respective parts.

In this coil spring assembly, the plurality of ribs are brought into contact with the inner circumferential edges of the coil spring and the projections are inserted into coil spring. The seat members are retained at ends of the coil spring. For this reason, it is unnecessary to perform the conventional special step for applying the adhesives. Also, the defects caused by the adhesives may be obviated.

Furthermore, in this case, since the protrusions are the ribs of the projections in the axial direction, it is possible to retain the protrusions with the coil spring at any position in the axial direction. It is possible to insert the seat members into the coil spring without paying any attention to a rotational position (phase) of the seat members relative to the coil spring.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

Figure 1:
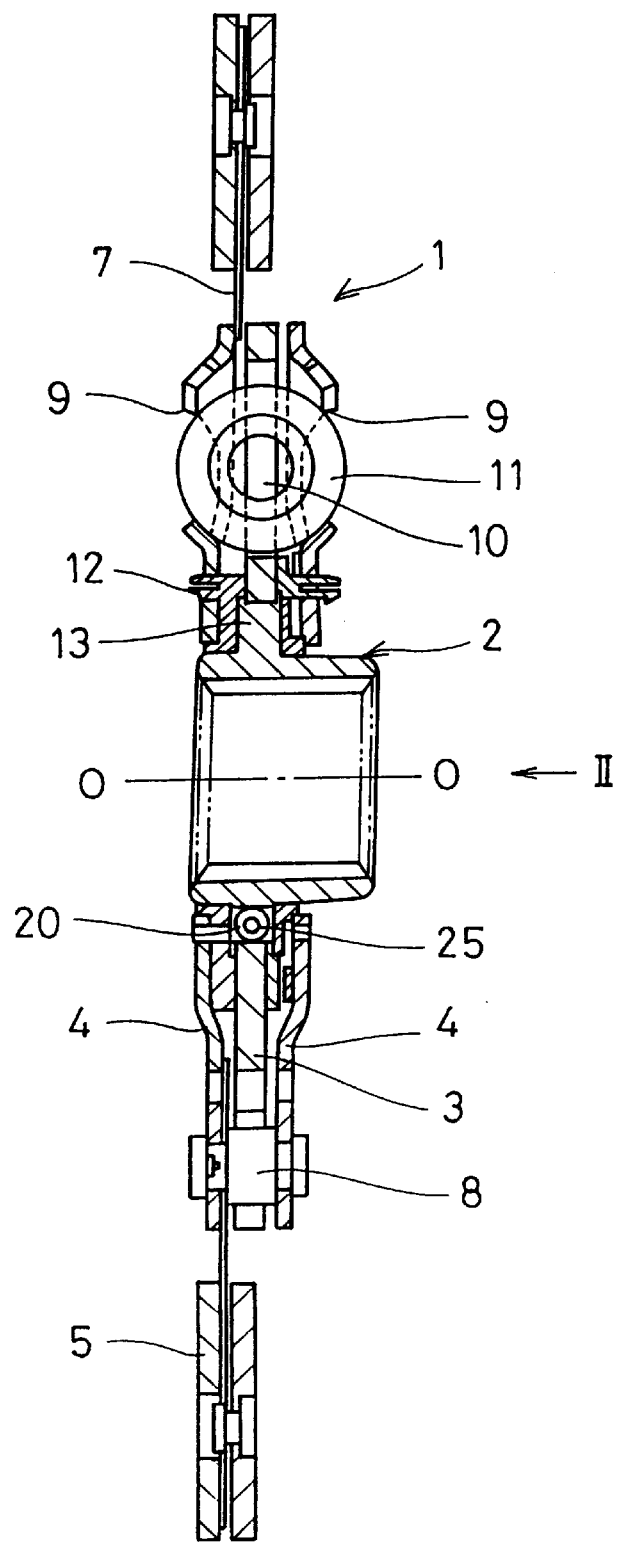
FIG. 1 is a side cross sectional view of a clutch disc assembly having coil spring assemblies, each of the coil spring assembly having a coil spring and spring seats in accordance with an embodiment of the present invention.
Figure 2:
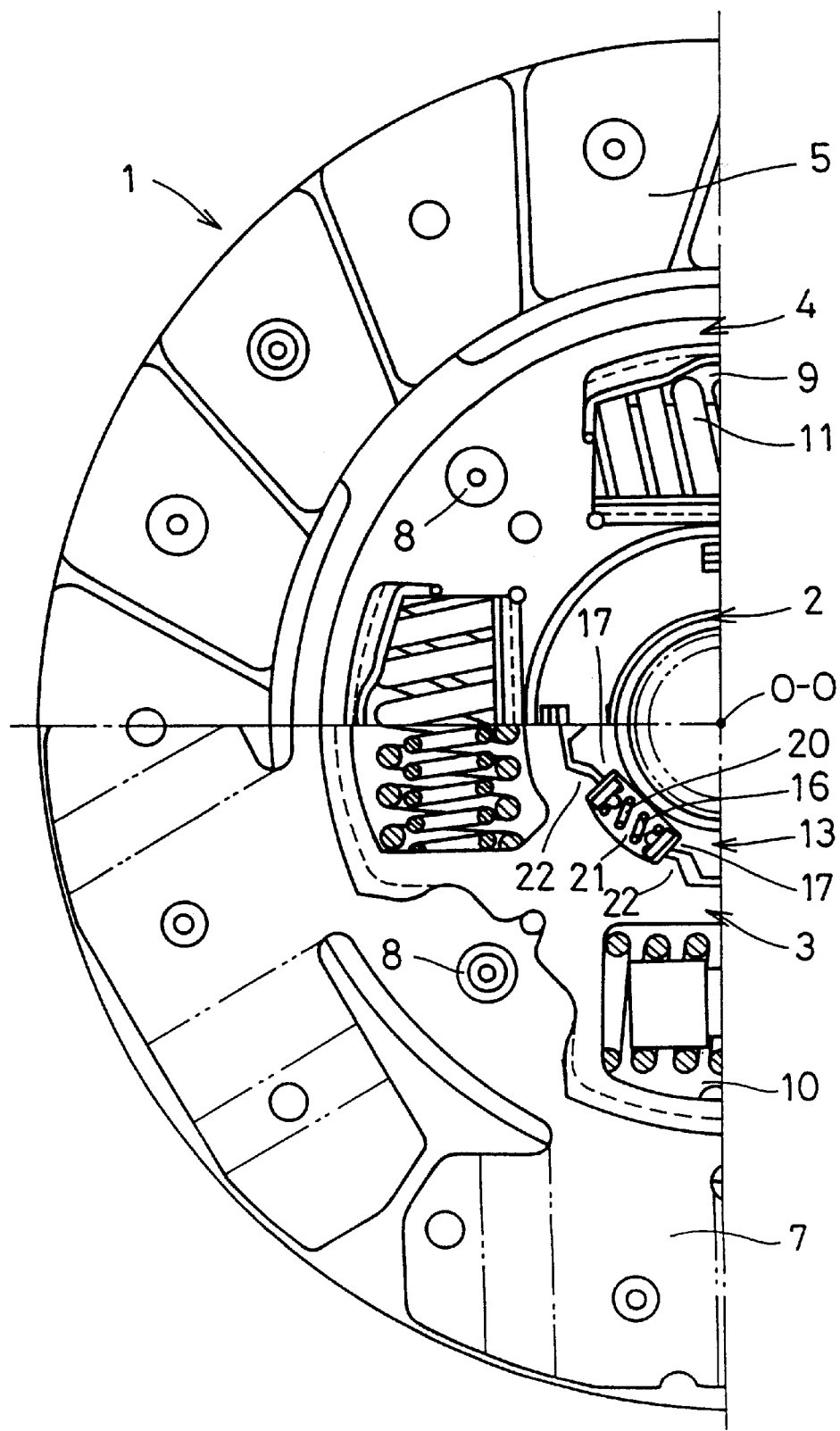
FIG. 2 is a fragmentary, part elevation, part cross sectional view of the clutch disc assembly depicted in FIG. 1, as seen looking in the direction of the arrow II in FIG. 1.

The present invention will now be described with reference to the accompanying drawings in which FIG. 1 is a longitudinal sectional view showing a clutch disc assembly 1 in accordance with an embodiment of the invention, and FIG. 2 is a fragmentary plan view as viewed from the direction II of FIG. 1. In these drawings, the clutch disc assembly 1 is provided with a hub 2 for coupling with a main drive shaft (only its centerline O—O is shown) of a transmission through a spline, an annular sub-plate 3 disposed radially outwardly of the hub 2, a pair of side plates 4 (clutch plate and retaining plate) disposed on opposite sides of the sub-plate 3 in the axial direction, and a frictional facing 5 disposed radially outwardly of the side plates 4.

The frictional facing 5 is coupled with an outer circumferential portion of one of the side plates 4 (i.e., clutch plate) through a cushioning plate 7. The outer circumferential portions of both side plates 4 are fixed to each other by stop pins 8 in the axial direction at several positions. The stop pins 8 extend through cutaways formed in the circumferential portion of the sub-plate 3.

The side plate 4 and the sub-plate 3 are coupled with each other in the clutch rotational direction by coil spring mechanisms 11 disposed in spring receiving portions 9 and 10 thereof. A friction generating mechanism 12 is disposed between the inner circumferential portion of the side plate 4 and the inner circumferential portion of the sub-plate 3 for dampening or attenuating the twist vibrations or the like by friction.

An annular hub flange 13 extending radially outwardly is provided in the intermediate portion of the hub 2 in the axial direction. The hub flange 13 is arranged to be substantially flush with the sub-plate 3 in the axial direction. Frictional mechanisms which are substantially the same as the friction generating mechanism 12 are also disposed between the hub flange 13 and the inner circumferential edge portions of both side plates 4.

As is apparent from FIG. 2, a pair of cutaway portions (only one of which is shown) are provided diametrically oppositely in the hub flange 13 of the hub 2. The spring receiving portions 16 (first spring receiving portion) are formed by the cutaway portions. The hub flange 13 is also provided with spring engagement portions 17 for limiting both ends of each spring receiving portions 16 in the clutch tangential direction (which is substantially in the clutch circumferential direction). In other words, each spring receiving portion 16 is formed between the pair of spring engagement portions 17 confronting in the clutch tangential direction.

A coil spring assembly 20 extending in the clutch tangential direction is disposed in each spring receiving portion 16. A portion, close to the centerline O—O, of each end portion of the coil spring assembly 20 is in engagement with or in confronting relation with the adjacent spring engagement portions 17 in the clutch rotational direction.

A spring receiving portion 21 for a portion, spaced apart from the centerline O—O, of the coil spring assembly 20 is provided in the inner circumferential portion of the above-described sub-plate 3. The sub-plate 3 is formed with spring engagement portions 22 which define the ends of each spring receiving portion 21 in the clutch tangential direction. In other words, each spring receiving portion 21 is formed between the pair of spring engagement portions 22 confronting each other in the clutch tangential direction. Also, spring engagement portions 22 are in confronting relation with or in engagement with end portions of the adjacent coil spring assembly 20 in the clutch rotational direction.

In such a structure, in the clutch engagement condition, a torque that has been transmitted from a flywheel (not shown) of an engine through the frictional facing 5 and the cushioning plate 7 to the side plates 4 is further transmitted from the side plate 4 through the coil spring mechanisms 11 to the sub-plate 3. The torque is further transmitted from the sub-plate 3 to the hub 2 and is transmitted therefrom to a main drive shaft of the transmission.

In the above-described operation, the side plate 4 and the sub-plate 3 are twisted relative to each other by the elastic deformation of the coil spring mechanisms 11, and the sub-plate 3 and the hub 2 are twisted relative to each other by the elastic deformation of the coil spring assemblies 20. The twist vibrations are attenuated by a hysteresis torque generated by these elastic deformations and the frictional mechanisms between the friction generating mechanism 12 and the hub flange 13 and the inner circumferential edge portions of the two side plates 4.

Figure 3:
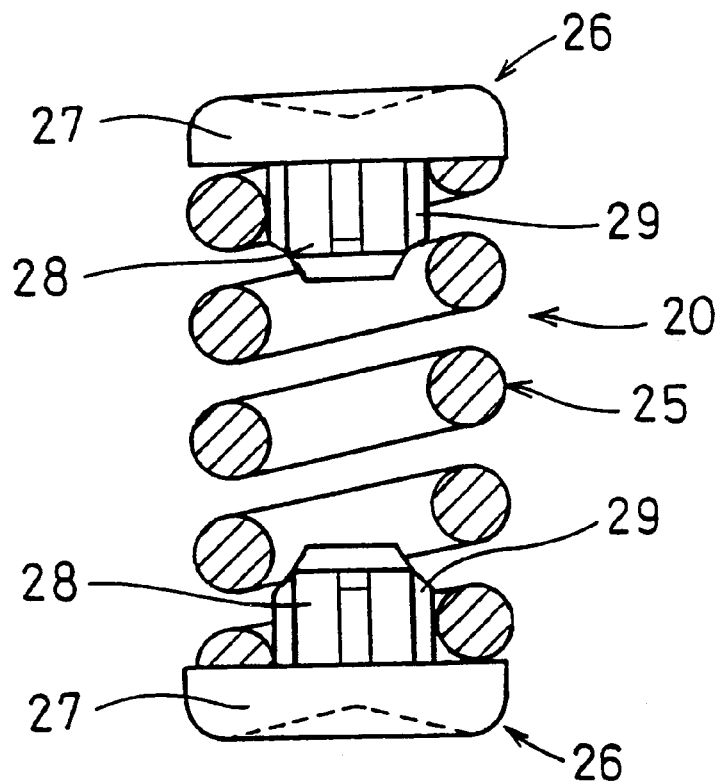
FIG. 3 is a part elevation, part cross-sectional view of one coil spring assembly shown removed from the clutch disc assembly depicted in FIGS. 1 and 2, with the coil spring shown in cross section and the spring seats shown in elevation.
Figure 4:
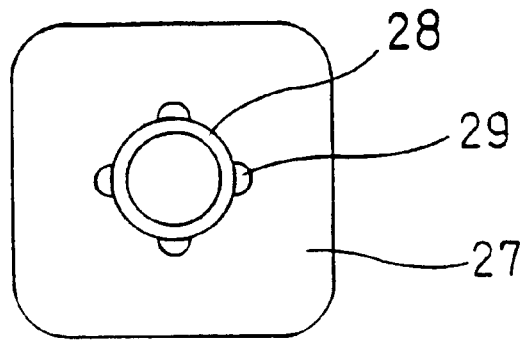
FIG. 4 is an elevation view of the seat member depicted in FIG. 3 shown removed from the coil spring.

The coil spring assembly 20 will now be described in more detail. In FIG. 3, each coil spring assembly 20 is provided with a coil spring 25 and a pair of seat members 26, one seat member 26 being fitted at a corresponding end of the coil spring 25. Each of the seat members 26 is integrally formed and provided with a disc-like receiver 27 having a relatively large diameter, a projection 28 integrally projecting from a center of the receiver 27, and a plurality of ribs 29 projecting outwardly from the outer circumferential surface of the projection 28, as is more clearly shown in FIG. 4. The plurality of ribs 29 extend in the axial direction of the projection 28 and are formed at an equal interval in the circumferential direction. The outer diameter of the projection 28 including the ribs 29 is substantially the same as an inner diameter of the coil spring 25. End coil portions at both ends of the coil spring 25 are seated to the receivers 27 and its inner circumference is retained by a plurality of ribs 29.

With such an arrangement, it is possible to assembly the coil spring assembly 20 as follows. For example, subsequently to a process for manufacturing the seat member 26 as one piece, the seat member 26 is fitted in the coil spring 25 in a process independent of a process for assembling the coil spring assembly 20 into the clutch disc assembly 1. If this fitting is completed, thereafter, the seat member 26 is prevented from being pulled apart from the coil spring 25 by the engagement of the ribs 29 and the inner circumferential edge of the coil spring 25 and it is possible to handle the coil spring 25 and the seat members 26 as one piece. It is therefore easy to handle the coil spring assembly 20 in the work for assembling the coil spring assembly 20 into the clutch disc assembly 1.

Also, since there is no fear that prior art hardened adhesives might be broken by friction or the like and would be dislodged as in the conventional arrangement, there is no possibility that the foreign matter powder or flakes would be splashed from the coil spring assembly 20 and would adhere to the respective parts of the clutch during the operation of the clutch disc assembly 1.

According to the present invention, it is possible to dispense with the process for applying the adhesives as in the conventional one, and to reduce the number of the steps. Also, it is possible to avoid the defect that the stiffened adhesives would be splashed by friction or the like to adversely affect the mechanical strength and the operation of the respective parts.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What I claim is:

1. A coil spring assembly comprising:

a coil spring; and at least one seat member disposed at one end of said coil spring, said seat member being formed homogeneously with a receiver and a generally cylindrical projection which extends from said receiver into said coil spring, said projection formed homogeneously with a plurality of generally parallel protrusions on an outer surface thereof, said protrusions extending from said projection contacting and engaging an inner surface said coil spring, said protrusions being circumferentially spaced apart from one another about an outer circumferential surface of said projection; and wherein said receiver has a generally rectangular shape and said projection extends outward from a central portion of said receiver, said protrusions are a plurality of ribs extending generally parallel to an axial length of said projection.

2. A damper mechanism comprising:

a first rotary member having a first spring receiving portion;

a second rotary member having a second spring receiving portion corresponding to said first spring receiving portion; and a coil spring assembly being disposed in said first receiving portion and said second receiving portion elastically coupling said first and second rotary members, said coil spring assembly comprising:

a coil spring; and at least one seat member disposed at one end of said coil spring, said seat member being formed homogeneously with a receiver and a generally cylindrical projection which extends from said receiver into said coil spring, said projection formed homogeneously with a plurality of generally parallel protrusions on an outer surface thereof, said protrusions extending from said projection contacting and engaging an inner surface said coil spring, said protrusions being circumferentially spaced apart from one another about an outer circumferential surface of said projection; and wherein said receiver has a generally rectangular shape and said projection extends outward from a central portion of said receiver, said protrusions are a plurality of ribs extending generally parallel to an axial length of said projection.

* * * * *